No. 692,982. Patented Feb. 11, 1902.
G. J. CAPEWELL.
BEARING FOR JOURNALS, SHAFTS, OR ROTATING COLUMNS.
(Application filed Mar. 5, 1901.)
(No Model.) 2 Sheets—Sheet 1.
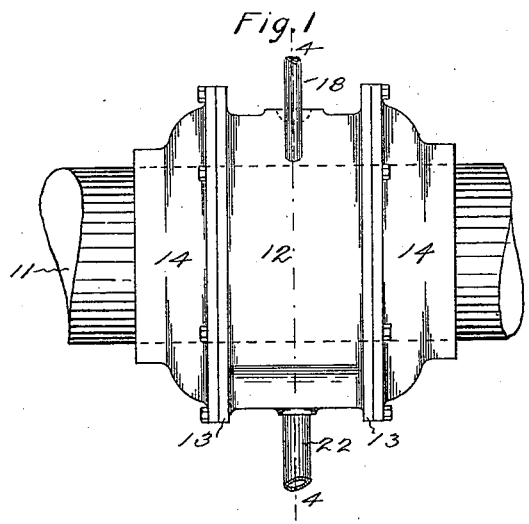
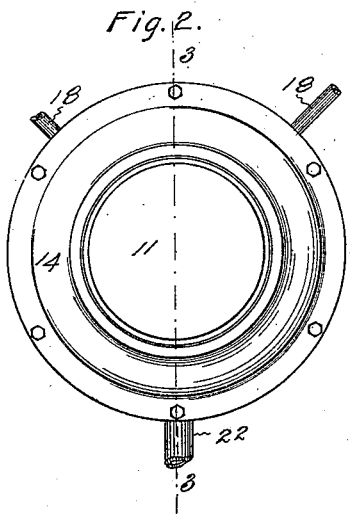
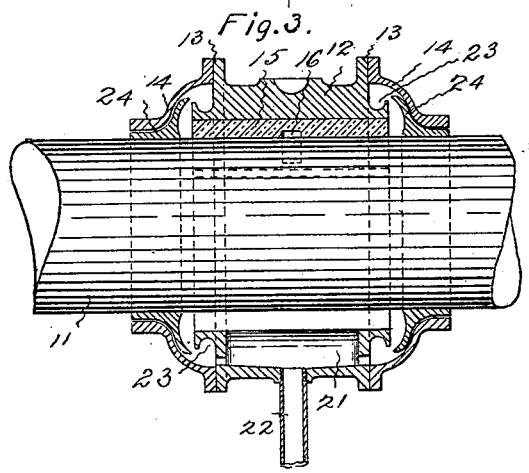
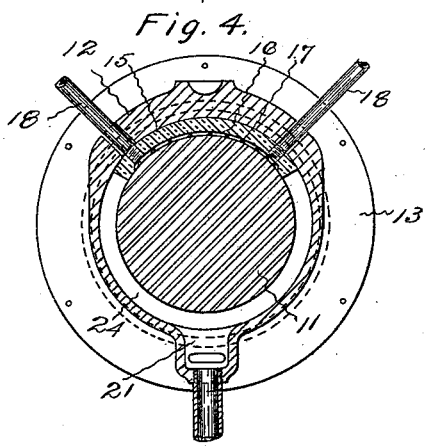
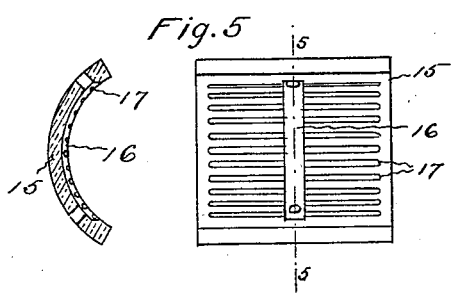
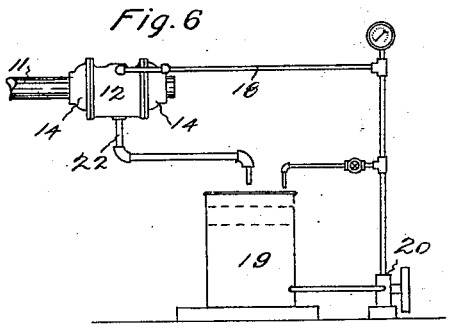
Witnesses:
Inventor:
George J. Capewell,
by Harry R. Williams
atty.
THE NORRIS PETERS CO., PHOTO-LITHO., WASHINGTON, D. C.

UNITED STATES PATENT OFFICE.

GEORGE J. CAPEWELL, OF HARTFORD, CONNECTICUT.

BEARING FOR JOURNALS, SHAFTS, OR ROTATING COLUMNS.

SPECIFICATION forming part of Letters Patent No. 692,982, dated February 11, 1902.

Application filed March 5, 1901. Serial No. 49,734. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Bearings for Journals, Shafts, or Rotating Columns, of which the following is a specification.

This invention relates to means for supporting journals, shafts, and rotating columns on liquid lubricating material.

The object of this invention is the production of a simple and inexpensive means by which a film of lubricating material may be kept between a journal and the bearing-section of its box, or between a shaft and the bearing-section of its block, or between a rotating column and the bearing-section of its bed for supporting the load and separating the moving from the stationary surfaces without using packings or other friction-producing means which are usually employed for retaining the lubricant under pressure and which increase the friction between the rotating and non-rotating parts in proportion to the pressure under which the lubricant is supplied.

In carrying out this invention a very small force-pump is connected in a duct leading from a tank of oil to the bearing-section of the stationary box, block, or bed, which section is preferably so formed as to distribute the oil forced to it by the pump over the entire bearing area. A duct is led to the oil-tank from a chamber into which the oil is directed after it flows between the stationary and movable surfaces, and deflecting means which make no connection between the stationary and movable surfaces are provided to prevent the escape of the oil through the openings between the stationary and movable parts and to cause the oil to flow into the collecting-chamber.

Figure 7:
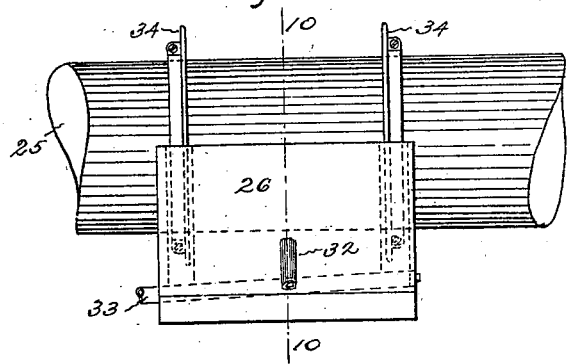
Figure 8:
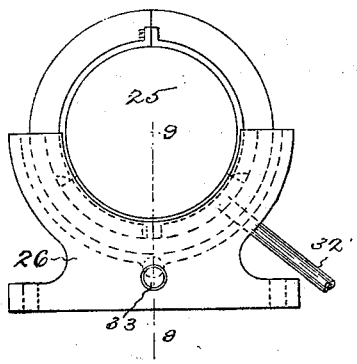
Figure 9:
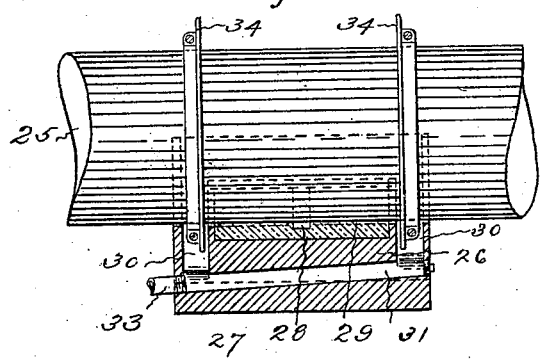
Figure 10:
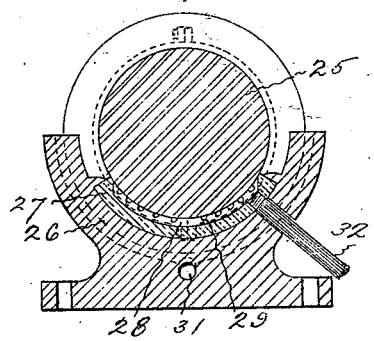
Figure 11:
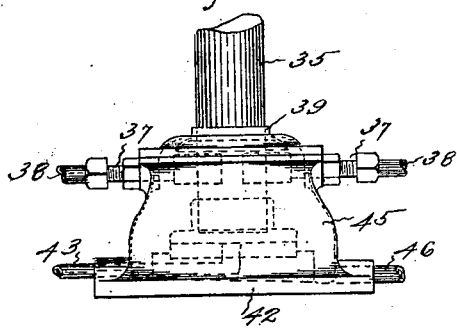
Figure 12:
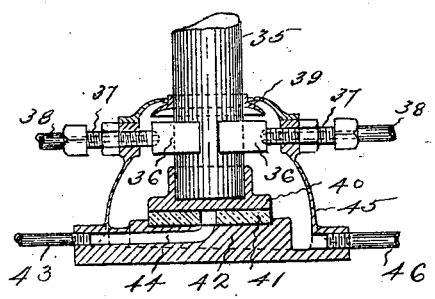

Figure 1 of the accompanying drawings shows a side elevation of a journal-bearing constructed to operate according to this invention. Fig. 2 shows an end elevation of the same bearing. Fig. 3 shows a longitudinal section of the journal-bearing on the plane indicated by the broken line 3 3 of Fig. 2. Fig. 4 shows a vertical section of the bearing on the plane indicated by the broken line 4 4 of Fig. 1. Fig. 5 shows a transverse section and a view of the inside face of one of the linings of this form of journal-bearing. Fig. 6 shows a diagram, on reduced scale, of the complete apparatus employed in practicing this invention. Fig. 7 shows a side elevation of a shaft-bearing constructed to operate according to this invention. Fig. 8 shows an end view of this shaft-bearing. Fig. 9 shows a longitudinal section of the shaft-bearing on the plane indicated by the broken line 9 9 of Fig. 8. Fig. 10 shows a transverse section of the shaft-bearing on the plane indicated by the broken line 10 10 of Fig. 7. Fig. 11 shows a side elevation of a step-bearing for a rotating column, and Fig. 12 shows a diametrical section of the step-bearing.

The journal 11 (shown in Figs. 1, 2, 3, and 4) supports an annular journal-box 12, to the flanges 13 of which guard-caps 14 are bolted. The bearing-section of this box—that is, the part that transmits the load upon the box to the journal—is a lining 15, that is formed of suitable metal and is fastened in the top of the box. The bearing-surface of this lining is provided with a transverse channel 16, leading from which are a number of longitudinal grooves 17, Fig. 5. Two ducts 18 pass through the upper part of the box and the bearing-lining and open into the channel 16, Fig. 4. In the form shown the lining is held in position by the ends of the ducts which lead from an oil-tank 19. Communicating with the ducts, so as to draw oil from the tank and force it into the channel and grooves between the bearing-lining and the top of the journal, is a force-pump 20, Fig. 6. In the bottom of the box is a drip-chamber 21, and leading from this chamber to the oil-tank is a duct 22. Around the ends of the box are grooves 23. Deflecting-collars 24 are secured to the journal in the openings between the guard-caps and the journal just beyond the ends of the bearing-lining. The inner edges of these collars terminate adjacent to the grooves around the ends of the boxes. These collars, which rotate with the journal, do not touch the ends of the box nor the guard-caps, which are stationary, Fig. 3. All of the weight of the load upon the box when the apparatus is in action is transmitted to the journal through the lining. When the pump is started, a quantity of oil is forced from the tank through the supply-ducts and caused to fill the channel and grooves in the friction-surface of the lining. As soon as the pressure of the oil becomes sufficiently great to overcome the weight of the load the oil lifts the lining from the journal and escapes in a thin sheet in all directions from between the lining and the journal. As the oil is continually fed to the channel and grooves a thin film of lubricant is constantly maintained between the lining and the journal. The oil that escapes from between the shell and the journal is prevented from flowing out along the journal by the deflecting-collars, which under the influence of centrifugal action direct the oil back toward the grooves around the ends of the box, through which grooves the oil flows until it drips into the collecting-chamber in the bottom of the box. From the collecting-chamber the oil flows back by gravity to the tank, from which it is again forced to the top of the box. The action of this apparatus maintains a thin film of lubricant throughout the entire bearing area between the lining and the journal without any packing or other friction-producing means for closing the openings between the stationary parts of the box and the adjacent movable parts of the journal, and the oil does not escape or leak out of the casing.

When practicing this process, large journals subjected to great weight can be continuously rotated for many hours with but a small expenditure of power without the journal or the box becoming heated in the least, for the entire load is supported upon the hydraulic flowing lubricant and the frictional resistance, due to rotation of rubbing metallic surfaces, is entirely eliminated. Experience has demonstrated that if the pump can supply oil under pressure per square inch greater than the pressure per square inch of the load the load will be carried by the oil in its attempt to escape, and of course if deflecting-collars are employed to prevent the outflow of the oil as it first projects itself from between the lining and the journal into a space in which it is not under pressure and the oil is directed to stationary parts it may be led back to the supply-tank without any leakage. With this apparatus no packings, which are a source of great frictional resistance, are required to confine the oil between the bearing-lining and the journal and effect the hydraulic action, and the pressure is generated by the action of the pump in overcoming the weight of the load upon the box. It has been found that under greatly-varying loads the journal will run with practically the same expenditure of power, for the element of frictional resistance remains the same, the only variation being in the power required to operate the pump as the load changes, which power is a comparatively small item.

The shaft 25 (shown in Figs. 7, 8, 9, and 10) is supported upon a block 26. The bearing-section of this block is the lining 27, the bearing-surface of which is provided with a transverse channel 28 and longitudinal grooves 29, leading therefrom, as previously described. In each end of this block is a chamber 30. Near the bottom these chambers open into the collecting-chamber or drip-passage 31. A duct 32 extends through the block and lining and opens into the channel in the bearing-surface of the lining. This duct is adapted to be connected with the supply-tank and with the force-pump. A duct 33 is connected with the drip-passage and led to the oil-tank. Bolted about the shaft so as to turn in the chambers 30 in the block just in front of the lining are the deflecting-collars 34. These collars do not engage with any portion of the block nor does any portion of the block engage with the shaft. Oil forced by the pump through the duct to the channel and grooves in the bearing-surface of the lining lifts the shaft and forms a film between the metallic surfaces, so as to support the shaft. As the oil escapes from between the shaft and the lining it is deflected by the collars into the chambers 30 near the ends of the block, from which it flows through the drip-passage and duct back to the supply-tank.

The vertical shaft or rotating column 35, that is shown in Figs. 11 and 12, is held in alinement by blocks 36, that are retained in position by the bolts 37. Ducts 38, that may be connected with the force-pump, are led through the bolts and blocks, so that oil may be forced between the blocks and the column. A deflecting-collar 39 is secured to the column above the blocks, so as to prevent the outflow of oil as it escapes from between the blocks and the column. A base 40 is secured to the lower end of this column, and this base rests upon a bearing-disk 41, that is supported by a bed 42. A duct 43, that is adapted to be connected with the force-pump, is connected with the passage 44 through the bed and through the bearing-disk, and when oil is forced by the pump through the bearing-disk the base of the column is lifted from the bearing-disk and supported by the film of oil that is flowing between them. The oil is prevented from leaking out as it escapes between the parts by the casing 45, that is attached to the bed and that supports the alining block-bolts. A duct 46 leads from this casing to the tank for the return flow of oil. In this form of bearing the rotating oil-deflecting parts are not in contact with any of the stationary oil-collecting parts, so that there is no rubbing together of rotating and non-rotating packing means.

I claim as my invention—

A hydraulic bearing mechanism for a journal, shaft or column, which comprises a stationary box, block or bed, the bearing-surface of which encircles only a portion of the periphery of the journal, shaft or column, and is not packed at its ends, a supply-duct leading from an oil-tank to the bearing-surface of the box, block or bed, a force-pump communicating with the supply-duct and adapted to force lubricant to the bearing-surface of the box, block or bed and maintain a flowing film of lubricant throughout the entire bearing area between the rotating and non-rotating surfaces, whereby the rotating and non-rotating bearing-surfaces are kept separated by a constantly-flowing film of lubricant and the full area of the bearing-surfaces utilized, a collecting-chamber, a duct leading from the collecting-chamber to the oil-tank, and deflecting means independent of and out of contact with any stationary part, arranged on the journal, shaft or column opposite to the ends of the bearing-surface for diverting the oil as it flows from between the rotating and non-rotating bearing-surfaces and directing it into the collecting-chamber, substantially as specified.

GEORGE J. CAPEWELL.

Witnesses:
V. R. HOLCOMB,
H. R. WILLIAMS.